United States Patent
Ishikawa et al.

(10) Patent No.: US 9,444,112 B2
(45) Date of Patent: Sep. 13, 2016

(54) FUEL CELL MONITORING DEVICE

(71) Applicants: DENSO CORPORATION, Kariya, Aichi-pref (JP); Nippon Soken, Inc., Nishio, Aichi-pref (JP); Toyota Jidosha Kabushiki Kaisha, Toyota-shi, Aichi-ken (JP)

(72) Inventors: Yuji Ishikawa, Aichi-ken (JP); Ikuyasu Kato, Obu (JP); Takashi Yamada, Hekinan (JP); Yuichi Sakajo, Toyohashi (JP); Keigo Suematsu, Toyota (JP)

(73) Assignees: DENSO CORPORATION, Kariya, Aichi-pref. (JP); NIPPON SOKEN, INC., Nishio, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 92 days.

(21) Appl. No.: 14/242,061

(22) Filed: Apr. 1, 2014

(65) Prior Publication Data

US 2014/0295302 A1  Oct. 2, 2014

(30) Foreign Application Priority Data

Apr. 2, 2013  (JP) .................................. 2013-076733

(51) Int. Cl.
*H01M 4/66* (2006.01)
*H01M 8/04* (2016.01)
*H01M 8/10* (2016.01)

(52) U.S. Cl.
CPC ..... *H01M 8/04119* (2013.01); *H01M 8/04388* (2013.01); *H01M 8/04395* (2013.01); *H01M8/04492* (2013.01); *H01M 8/04552* (2013.01); *H01M 8/04582* (2013.01); *H01M 8/04641* (2013.01); *H01M 8/04701* (2013.01); *H01M 8/0441* (2013.01); *H01M 8/04402* (2013.01); *H01M 2008/1095* (2013.01); *Y02E 60/50* (2013.01)

(58) Field of Classification Search
CPC .................. H01M 8/04582; H01M 8/04552; H01M 8/04641; H01M 8/04402; H01M 8/0441

See application file for complete search history.

(56) References Cited

U.S. PATENT DOCUMENTS

| | | | |
|---|---|---|---|
| 2008/0318089 A1* | 12/2008 | Schneider et al. .............. | 429/13 |
| 2009/0061263 A1* | 3/2009 | Watanabe ....................... | 429/13 |
| 2009/0068506 A1* | 3/2009 | Tomura .......................... | 429/13 |
| 2010/0141262 A1* | 6/2010 | Watanabe et al. ............. | 324/430 |
| 2010/0216043 A1* | 8/2010 | Gottmann et al. ............. | 429/432 |
| 2010/0239930 A1 | 9/2010 | Umayahara et al. | |
| 2011/0269046 A1 | 11/2011 | Suematsu | |
| 2012/0145564 A1* | 6/2012 | Yamazaki et al. .......... | 205/790.5 |

FOREIGN PATENT DOCUMENTS

| | | |
|---|---|---|
| JP | 2003-086220 | 3/2003 |
| JP | 2007-048559 | 2/2007 |
| JP | 2009-158383 | 7/2009 |
| JP | 2010-165463 | 7/2010 |
| JP | 2010-251086 | 11/2010 |

* cited by examiner

*Primary Examiner* — Jane Rhee
(74) *Attorney, Agent, or Firm* — Harness, Dickey & Pierce, P.L.C.

(57) ABSTRACT

In a fuel cell monitoring device, a gas-diffusion resistance calculation section calculates a gas-diffusion resistance $R_{total}$ indicating a difficulty of diffusing reaction gas to a catalyst layer in a fuel cell based on a gas reaction resistance $R_{ct}$ calculated by a resistance calculation section. A second diffusion resistance calculation section calculates a second diffusion resistance $R_{dry}$ varying depending on a dried-up in the fuel cell based on a proton transfer resistance $R_{mem}$ calculated by the resistance calculation section. A first diffusion resistance calculation section calculates a first diffusion resistance $R_{wet}$ varying depending on a flooding in the fuel cell by subtracting the second diffusion resistance $R_{dry}$ from the gas-diffusion resistance $R_{total}$. A water content calculation section calculates a water content of the fuel cell based on the first diffusion resistance. A recovery control section adjusts the water content in the fuel cell based on the calculated water content.

14 Claims, 12 Drawing Sheets

FUEL CELL MONITORING DEVICE

CROSS-REFERENCE TO RELATED APPLICATION

This application is related to and claims priority from Japanese Patent Application No. 2013-76733 filed on Apr. 2, 2013, the contents of which are hereby incorporated by reference.

BACKGROUND OF THE INVENTION

1. Field of the Invention

The present invention relates to fuel cell monitoring devices for monitoring various operational conditions of a fuel cell comprised of one or more unit cells.

2. Description of the Related Art

There have been known a conventional technique to detect a water content in a fuel cell on the basis of impedances of the fuel cell at different frequencies, and adjust the water content in the fuel cell to an optimum value. For example, Japanese patent laid open publication No. JP 2003-86220 discloses such a conventional technique.

The technique disclosed in JP 2003-86220 calculates a resistance component R1 and a resistance component R2, and estimates a water content of the fuel cell on the basis of the resistance component R1 and the resistance component R2, where the resistance component R1 is increased when the water content of the fuel cell is insufficient (in a dried-up state), and the resistance component R2 is increased when an excessive water content is present in the fuel cell (in a flooding state). The resistance component R1 corresponds to a proton transfer resistance in an electrolyte film in the fuel cell. The resistance component R2 corresponds to a gas reaction resistance which is obtained by converting an activation overvoltage and a concentration overvoltage (a diffusion overvoltage).

The conventional method previously described calculates the gas reaction resistance, but the calculated gas reaction resistance is significantly affected by various conditions, for example, a condition when diffusion of a reaction gas is blocked in the inside of the fuel cell if the fuel cell is flooded. In addition, the calculated gas reaction resistance is significantly affected by a change of a gas concentration generated when a gas supply amount is changed.

Accordingly, the conventional technique for detecting a water content in the inside of the fuel cell has an insufficient detection accuracy because of calculating the water content of the fuel cell on the basis of the gas reaction resistance only. In other words, it is difficult for the conventional techniques to detect a correct excess amount of water in the inside of the fuel cell with a high accuracy.

In general, a diffusion state of a reaction gas such as an oxidation gas and a fuel gas is decreased or deteriorated in the inside of the fuel cell when flooding occurs in the inside of the fuel cell. It is possible to detect a correct excess amount of water contained in the inside of the fuel cell on the basis of a gas diffusion resistance because the gas diffusion resistance clearly shows a degree of difficulty of diffusion of the reaction gas in the inside of the fuel cell.

The inventors of the present invention have known that such a gas diffusion resistance in a fuel cell can be quantitatively detected on the basis of a gas reaction resistance and a limit current density. By the way, the gas diffusion resistance often varies when the dried-up state is generated in the inside of the fuel cell.

For example, when a resistance component in a catalyst layer in the fuel cell increases by the dried-up state in the inside of the fuel cell, this causes a difficulty for the reaction gas to reach the catalyst layer, and the gas diffusion resistance thereby increases. That is, the gas diffusion resistance has diffusion characteristics depending on the dried-up state in the inside of the fuel cell in addition to the flooding state in the inside of the fuel cell.

Accordingly, even if a water content in the inside of the fuel cell is normally detected on the basis of the gas diffusion resistance only, it is difficult to detect a correct excess amount of water contained in the inside of the fuel cell.

SUMMARY

It is therefore desired to provide a fuel cell monitoring device capable of quantitatively detecting correct gas diffusion characteristics of a reaction gas, which change depending on a flooding state in the inside of the fuel cell.

An exemplary embodiment provides a fuel cell monitoring device which monitors a fuel cell. The fuel cell is comprised of one or more unit cells. The fuel cell performs electrochemical reaction of reaction gas comprised of fuel gas and oxidizing gas and generates electric power when receiving the reaction gas. The fuel cell monitoring device according to the exemplary embodiment is comprised of a current detection section, a voltage detection section, a signal superposing section, an impedance calculation section, and a diffusion resistance detection section. The current detection section detects an output current of the fuel cell. The voltage detection section detects an output voltage of each of the unit cells. The signal superposing section superimposes a signal of a different frequency on an output signal of the fuel cell. The impedance calculation section calculates an impedance at a different frequency on the basis of the current detected by the current detection section and the voltage detected by the voltage detection section when the signal superposing section superimposes the signal of a different frequency on the output signal of the fuel cell. The diffusion resistance detection section calculates a first diffusion resistance showing diffusion characteristics varying due to a flooding in the inside of the fuel cell. The diffusion resistance detection section is comprised of a resistance calculation section, a gas diffusion resistance calculation section, a second diffusion resistance calculation section and a first diffusion resistance calculation section. The resistance calculation section calculates a proton transfer resistance and a gas reaction resistance on the basis of the impedance at a different frequency calculated by the impedance calculation section. The gas diffusion resistance calculation section calculates a gas diffusion resistance which shows a difficulty of diffusing the reaction gas in the inside of the fuel cell. The second diffusion resistance calculation section calculates a second diffusion resistance, on the basis of the proton transfer resistance, showing the diffusion characteristics varying due to a dried-up in the inside of the fuel cell. The first diffusion resistance calculation section calculates the first diffusion resistance by subtracting the second diffusion resistance from the gas diffusion resistance.

That is, the fuel cell monitoring device according to the exemplary embodiment can calculate the first diffusion resistance by subtracting the second diffusion resistance, which shows the diffusion characteristics varying depending on the dried-up of the inside of the fuel cell from the reaction gas diffusion characteristics. The fuel cell monitoring device obtains the first diffusion resistance as a quantitative value regarding the diffusion characteristics of the reaction gas varying due to the flooding in the inside if the fuel cell. As a result, it is possible to detect the excess state of the water content in the inside of the fuel cell with high accuracy.

Still further, the fuel cell monitoring device according to the exemplary embodiment further has a water content calculation section which calculates the water content in the inside of the fuel cell on the basis of the first diffusion resistance. This structure makes it possible to detect the water content in the inside of the fuel cell with high accuracy and correctly detect an excess state of the water content in the inside of the fuel cell Still further, the fuel cell monitoring device according to the exemplary embodiment further has a recovery control section which performs a water content recovery process so that the water content in the inside of the fuel cell becomes within an optimum water content range when the water content of the inside of the fuel cell calculated by the water content calculation section is out of the optimum water content range. This structure of the fuel cell monitoring device makes it possible to maintain the amount of the water content in the inside of the fuel cell within the optimum water content range and to drive the fuel cell with high efficiency.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
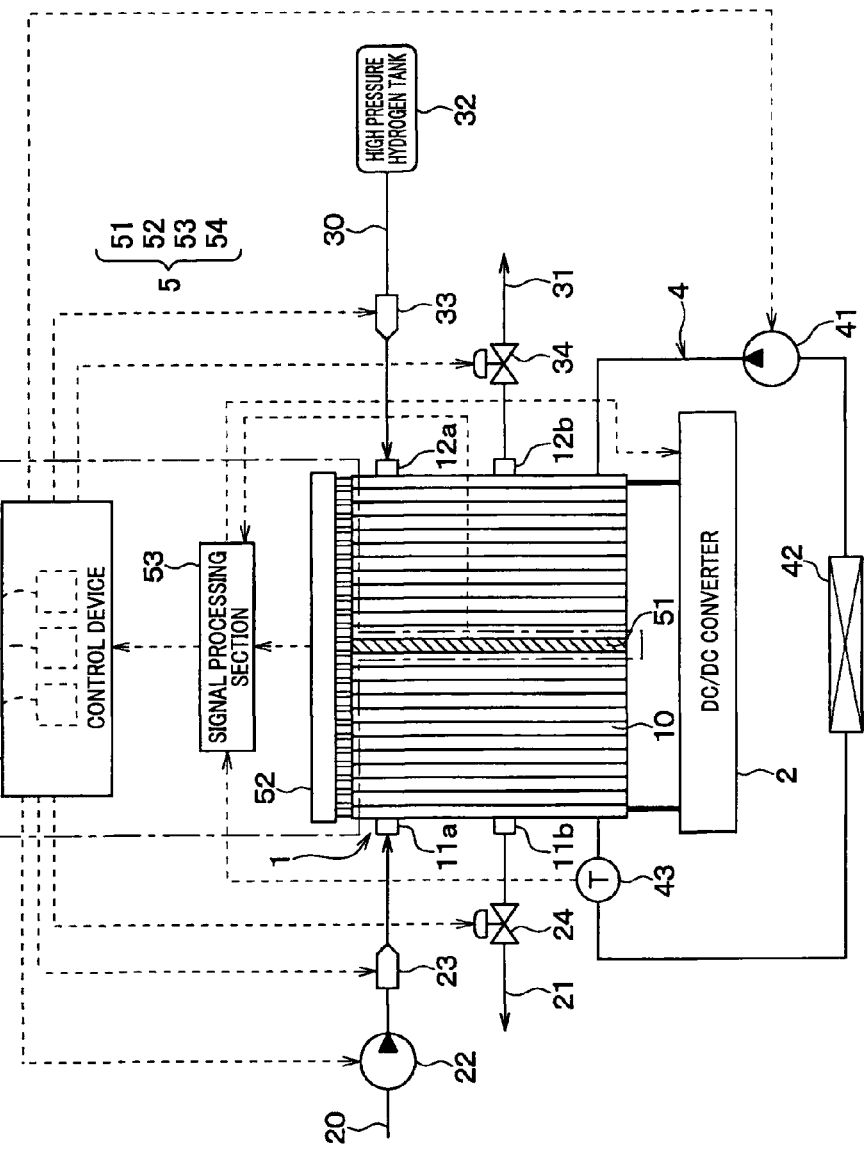
FIG. 1 is a view showing an overall structure of a fuel cell system comprised of a fuel cell and a fuel cell monitoring device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a fuel cell monitoring device according to an exemplary embodiment with reference to FIG. 1 to FIG. 18.

FIG. 1 is a view showing an overall structure of a fuel cell system comprised of a fuel cell 1 and the fuel cell monitoring device 5 according to the exemplary embodiment. The fuel cell monitoring device 5 according to the exemplary embodiment is used in a fuel cell system of a fuel cell vehicle as one type of electric vehicles. The fuel cell monitoring device 5 according to the exemplary embodiment monitors the condition of the fuel cell 1 mounted to the fuel cell vehicle.

The fuel cell 1 performs an electrochemical reaction of reaction gas such as hydrogen gas (as a fuel gas) and oxygen gas (as an oxidizing gas) to generate electric energy. The exemplary embodiment uses a solid polymer fuel cell as the fuel cell 1.

Through a DC-DC converter 2 in the overall structure of the fuel cell system shown in FIG. 1, the fuel cell 1 supplies an electric power to various types of electric loads such as an electric motor and a rechargeable battery. The electric motor is mounted to the vehicle and works as a main motor to move the vehicle. The fuel cell 1 is comprised of a plurality of unit cells 10. The unit cells 10 have a series connected structure in which the unit cells 10 are stacked in series and electrically connected together as shown in FIG. 1.

Figure 2:
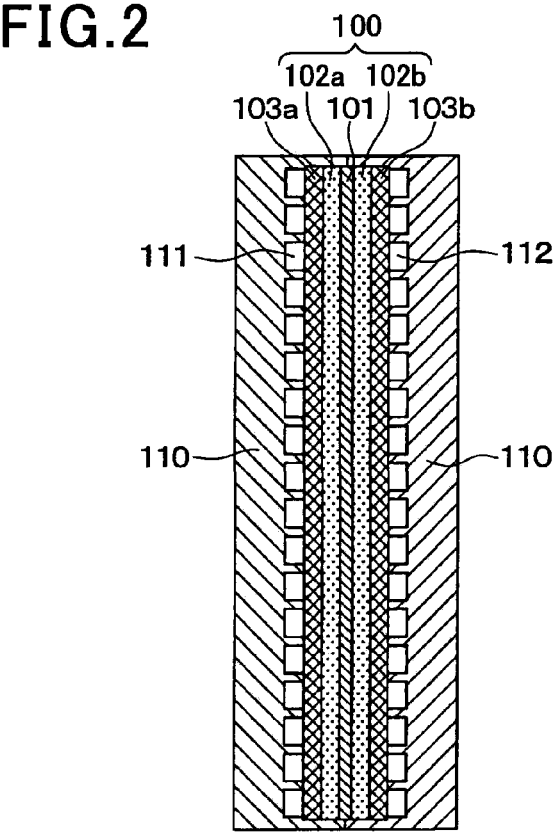
FIG. 2 is a view showing a schematic cross section of each of unit cells in the fuel cell in the fuel cell system according to the exemplary embodiment of the present invention shown in FIG. 1.

FIG. 2 is a view showing a schematic cross section of each of the unit cells 10 in the fuel cell 1 in the fuel cell system according to the exemplary embodiment shown in FIG. 1. In the cross section shown in FIG. 2, each of the unit cells 10 is comprised of a film electrode connected section 100, a pair of diffusion layers 103a and 103b and a pair of separators 110. The film electrode connected section 100 is comprised of an electrolyte 101 and a pair of catalyst layers 102a and 102b. The electrolyte 101 is arranged between the catalyst layers 102a and 102b. The film electrode connected section 100 is arranged between the diffusion layers 103a and 103b. The separators 110 support the diffusion layers 103a and 103b.

The electrolyte 101 is an ion exchange membrane having a proton conductivity made of polymer film such as aqueous fluorocarbon and hydrocarbon.

The catalyst layers 102a and 102b make electrodes. That is, the catalyst layer 102a forms an anode electrode, and the catalyst layer 102b forms a cathode electrode.

Figure 3:
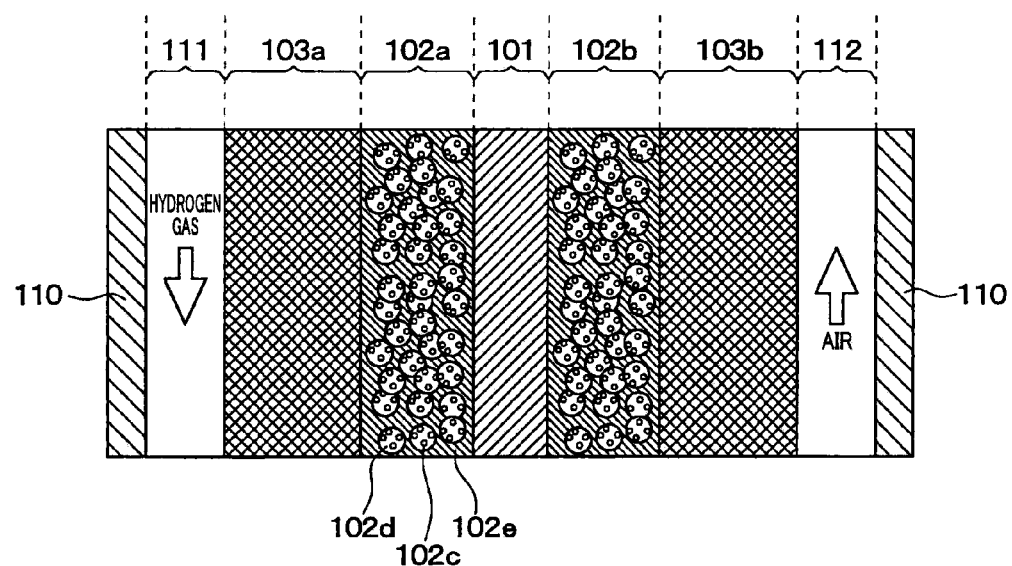
FIG. 3 is a view showing a schematic cross section of an internal structure of the unit cell in the fuel cell shown in FIG. 2.

FIG. 3 is a view showing a schematic cross section of an internal structure of the unit cell 10 in the fuel cell 1 shown in FIG. 2.

As shown in FIG. 3, each of the catalyst layers 102a and 102b is comprised of catalyst particles 102c (for example, platinum particles), supporting carbon particles 102d for supporting the catalyst particles 102c, and ionomer (polymer electrolyte) with which the supporting carbon particles 102d is covered.

The reaction gas is diffused into each of the catalyst layers 102a and 102b through the diffusion layers 103a and 103b. The diffusion layers 103a and 103b are made of porous member (for example, carbon paper, carbon cloth, etc.) having a gas permeability and an electron conductivity.

The separators 110 are made of conductive carbon base material. In each of the separators 110, a hydrogen gas passage 111 is formed to face the anode catalyst layer 102a as the anode electrode and an air passage 112 is formed to face the catalyst layer 102b as the cathode electrode. A fuel gas (which is hydrogen gas in the exemplary embodiment) flows through the hydrogen gas passage. An oxidation gas (which is contained in air in the exemplary embodiment) flows through the air passage 112.

When receiving hydrogen gas (as a fuel gas) and air (as an oxidation gas), each of the unit cells 10 performs electrochemical reaction between the hydrogen and the oxygen in the air and generates electric energy by the following chemical reaction formula.

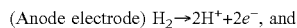
(Anode electrode) $H_2 \rightarrow 2H^+ + 2e^-$, and

(Cathode electrode) $2H^+ + 1/2O_2 + 2e^- \rightarrow H2O$.

By the way, the fuel cell 1 is electrically connected to various types of electric loads through a DC-DC converter 2. An electric power is supplied in bi-directionally between the fuel cell 1 and these various types of the electric loads. The DC-DC converter 2 controls the flow of electric power from the fuel cell 1 to these electric loads, or from the electric loads to the fuel cell 1.

The electrochemical reaction between hydrogen gas and oxygen gas generates water and the generated water often stays in a downstream side of the hydrogen gas passage 111 and the air passage 112 in each of the unit cells 10. The presence of water in the downstream side of the hydrogen gas passage 111 and the air passage 112 prevents the diffusion of the reaction gas to each of the catalyst layers 102a and 102b.

The fuel cell monitoring device 5 according to the exemplary embodiment is connected to the fuel cell 1 to monitor the condition of the fuel cell 1, for example, a diffusion state of the reaction gas in the unit cells 10 and the water content in each of the unit cells 10. The operation of the fuel cell monitoring device 5 according to the exemplary embodiment will be explained later in detail.

The fuel cell 1 has an air inlet section 11a and an air outlet section 11b. The air inlet section 11a is connected to an air supply pipe 20, through which air is supplied into the inside of the fuel cell 1. The air outlet section 11b is connected to an air discharge pipe 21 through which the air in the fuel cell 1 is discharged. The air inlet section 11a forms a reaction gas inlet section of the fuel cell 1. The air outlet section 11b forms a reaction gas outlet section of the fuel cell 1.

The air supply pipe 20 is equipped with an air pump 22. The air pump 22 forcedly supplies air, which is introduced through the uppermost stream side of their supply pipe 20, into the inside of the fuel cell 1. Further, an air pressure adjustment valve 23 is mounted to the air supply pipe 20 between the fuel cell 1 and the air pump 22. The air pressure adjustment valve 23 adjusts a pressure of air to be supplied to the fuel cell 1. An electromagnetic valve or a solenoid valve 24 is mounted to the air discharge pipe 21. The water generated by the electrochemical reaction in the fuel cell 1, impurities, etc. remaining in the fuel cell 1 are discharged to the outside by the control of the electromagnetic valve 24.

The fuel cell 1 has a hydrogen gas inlet section 12a and a hydrogen gas outlet section 12b. The hydrogen gas inlet section 12a is connected to a hydrogen gas supply pipe 30, through which a hydrogen gas is introduced into the inside of the fuel cell 1. The hydrogen gas outlet section 12b is connected to a hydrogen gas discharge pipe 31, through which a very small quantity of unreacted hydrogen gas, etc. remaining in the fuel cell 1 is discharged to the outside of the fuel cell 1. The hydrogen gas inlet section 12a also forms the reaction gas inlet section of the fuel cell 1. The hydrogen gas outlet section 12b also forms the reaction gas outlet section of the fuel cell 1.

A high pressure hydrogen tank 32 is arranged at the uppermost stream side of the hydrogen gas supply pipe 30. High pressure hydrogen gas is stored in the high pressure hydrogen tank 32. A hydrogen gas adjustment valve 33 is mounted to the hydrogen gas supply pipe 30 between the high pressure hydrogen tank 32 and the fuel cell 1. The hydrogen gas adjustment valve 33 adjusts a pressure of hydrogen gas to be supplied to the fuel cell 1. An electromagnetic valve or a solenoid valve 34 is mounted to the hydrogen gas discharge pipe 31. The small quantity of hydrogen gas, etc. remaining in the fuel cell 1 is discharged to the outside of the fuel cell 1 by the control of the electromagnetic valve 34.

A pressure difference adjustment section used in the exemplary embodiment is formed by the air pressure adjustment valve 23, the hydrogen gas adjustment valve 33, the electromagnetic valve 24 and the electromagnetic valve 34. The pressure difference adjustment section adjusts a difference in pressure between the gas inlet section (composed of the air inlet section 11a and the hydrogen gas inlet section 12a) and the gas outlet section (composed of the air outlet section 11b and the hydrogen gas outlet section 12b).

A cooling water circulation circuit 4 is connected as a cooling system to the fuel cell 1. The cooling water circulation circuit 4 as the cooling system adjusts a temperature of the fuel cell 1. The cooling water circulation circuit 4 is equipped with a water pump 41 and a radiator 42. The water pump 41 circulates cooling water in the fuel cell 1. The radiator 42 performs heat exchange between the cooling water and an outside air to discharge heat energy in the fuel cell 1.

A temperature sensor 43 is mounted to the cooling water circulation circuit 4, which indirectly detects a temperature of the fuel cell 1 on the basis of a temperature of the cooling water passed through the fuel cell 1. In the exemplary embodiment, the water pump 41 and the radiator 42 form a temperature adjustment section capable of adjusting a temperature of the fuel cell 1.

Next, a description will now be given of the structure and operation of the fuel cell monitoring device 5 according to the exemplary embodiment. The fuel cell monitoring device 5 is substantially comprised of a current detection section 51, a voltage detection section 52, a signal processing section 53 and a control section 54.

Figure 4:
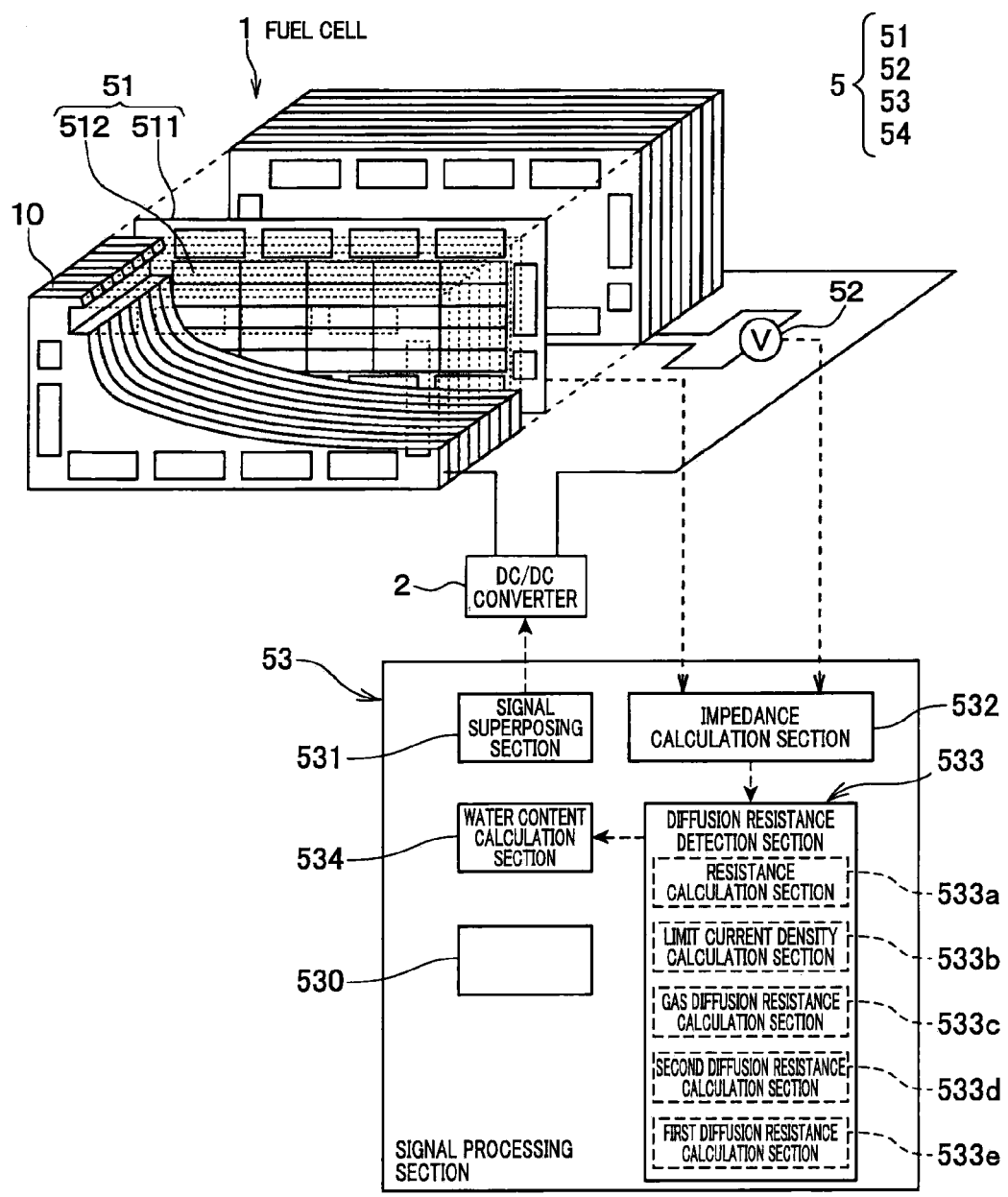
FIG. 4 is a view showing a schematic structure of the fuel cell, a DC-DC converter and the fuel cell monitoring device according to the exemplary embodiment of the present invention shown in FIG. 1.

A description will now be given of the current detection section 51, the voltage detection section 52 and the signal processing section 53 with reference to FIG. 4. FIG. 4 is a view showing a schematic structure of the fuel cell 1, the DC-DC converter 2 and the fuel cell monitoring device 5 according to the exemplary embodiment shown in FIG. 1. In particular, FIG. 4 is a perspective view showing an internal structure of a part of the unit cell 10 in the fuel cell 1. The fuel cell monitoring device 5 according to the exemplary embodiment is comprised of the current detection section 51, the voltage detection section 52, the signal processing section 53 and the control section 54.

The current detection section 51 detects an output current at a local position of the unit cell 10. The current detection section 51 is comprised of a side plate 511 and a current sensor 512. The side plate 511 is arranged adjacent to the respective unit cell 10. The current sensor 512 is arranged at a position corresponding to the local position of the unit cell 10 and detects a current which flows in the local position of the unit cell 10. For example, it is possible to use a sensor using a shunt resistance, a sensor using a Hall effect device, etc. It is also possible to arrange the current detection section 51 at a side section, instead of a middle section, in the stacked direction of the unit cells 10 in the fuel cell 1.

The voltage detection section 52 detects an output voltage of the unit cell 10. In the exemplary embodiment, the voltage detection section 52 can detect an output voltage of each of the unit cells 10. The current detection section 51 and the voltage detection section 52 are connected to the signal processing section 53 so that the signal processing section 53 inputs the output signals transmitted from the current detection section 51 and the voltage detection section 52.

The signal processing section 53 performs a control process and an arithmetic process on the basis of various types of the received input signals. The signal processing section 53 is a microcomputer and peripheral devices. The microcomputer is widely known and substantially comprised of a central processing unit (CPU), and various types of memories 530 such as a ROM and RAM forming a memory section.

The signal processing section 53 is equipped with a signal superposing section 531, an impedance calculation section 532, a diffusion resistance detection section 533, and a water content calculation section 543. It is possible to from these sections 531, 532, 533 and 534 by either software programs or hardware devices.

Figure 5:
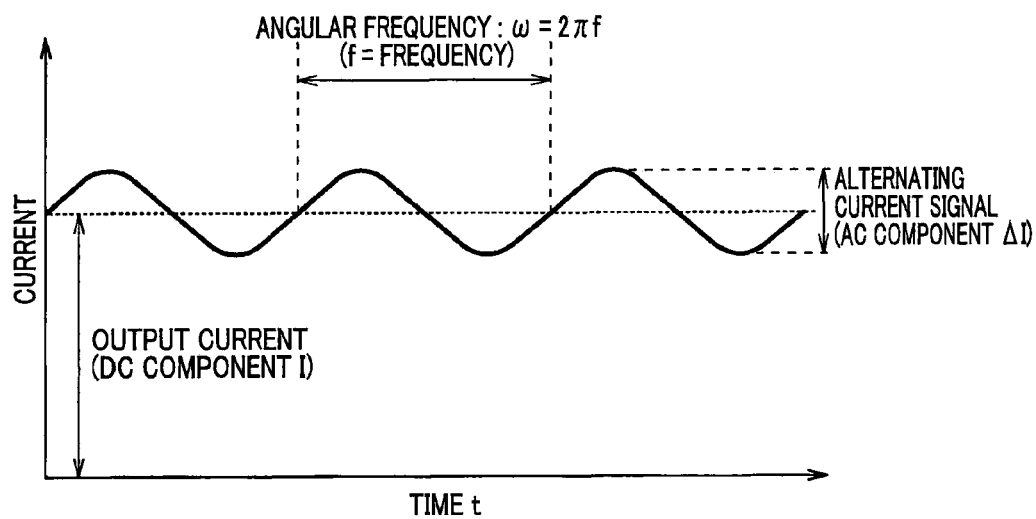
FIG. 5 is a view explaining an alternating current signal which is superposed on an output current of the fuel cell by a signal superposing section in the fuel cell monitoring device according to the exemplary embodiment of the present invention shown in FIG. 1.

The signal superposing section 531 is connected to the fuel cell 1 through the DC-DC converter 2. FIG. 5 is a view explaining an alternating current signal which is superposed on an output current of the fuel cell by a signal superposing section in the fuel cell monitoring device 5 according to the exemplary embodiment shown in FIG. 1. As shown in FIG. 5, the signal superposing section 531 superposes an alternating current signal (as an alternating current component $\Delta I$) having a predetermined frequency on the output current of the fuel cell 1.

The signal superposing section 531 is capable of superposing an alternating current signal having a different frequency such as a high frequency alternating current signal (for example, 1 kHz) and a low frequency alternating current signal (for example, 20 Hz) on the output current of the fuel cell 1.

It is preferable for the signal superposing section 531 to superpose the alternating current within a range of 10% of the output current of the fuel cell 1 while considering influence of the power generation in the fuel cell 1. It is also acceptable to adjust a magnitude of the alternating current according to the power generation condition of the fuel cell 1.

The impedance calculation section 532 calculates an impedance of the fuel cell 1 at a different frequency on the basis of a current detected by the current detection section 51 and a voltage detected by the voltage detection section 52 and when the signal superposing section 531 superposes the alternating current on the output current of the fuel cell 1.

In particular, the impedance calculation section 532 in the fuel cell 1 according to the exemplary embodiment is configured to calculate the impedance of each of the unit cells 10 in the fuel cell 1 at a different frequency. For example, the impedance calculation section 532 performs a fast Fourier transform, etc. in order to calculate an absolute value and a phase angle of the impedance of the unit cell 10 at a different frequency, i.e. at the second frequency.

The diffusion resistance detection section 533 detects a first diffusion resistance $R_{wet}$ which is a parameter (s/m) showing diffusion characteristics changed depending on flooding in the inside of the fuel cell 1. That is, the diffusion resistance detection section 533 is configured to detect the first diffusion resistance $R_{wet}$ of each of unit cells 10.

Figure 6:
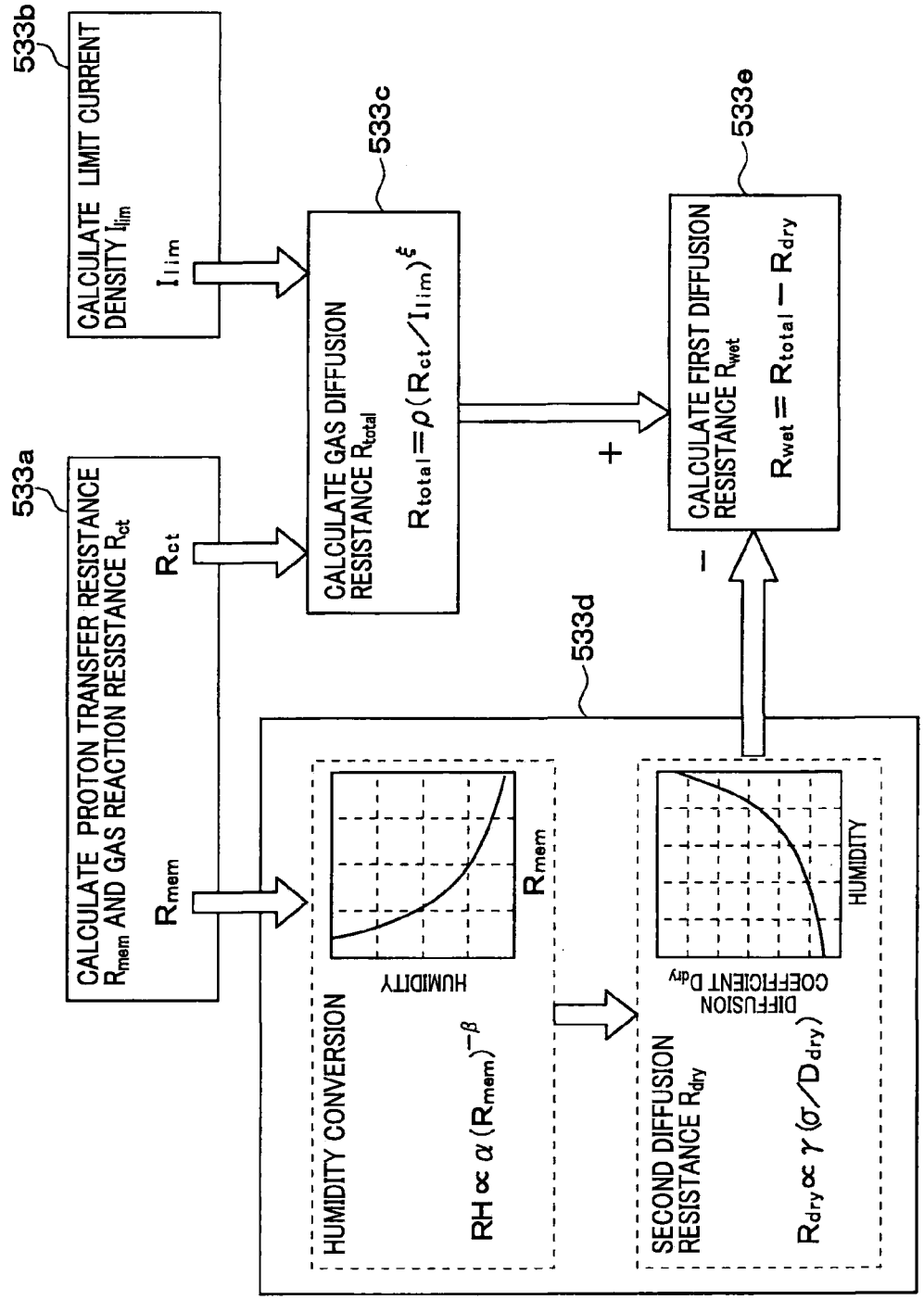
FIG. 6 is a view explaining a process of detecting the first diffusion resistance of each of the unit cells in the fuel cell by a diffusion resistance detection section in the fuel cell monitoring device according to the exemplary embodiment of the present invention shown in FIG. 1.

FIG. 6 is a view explaining a process of detecting the first diffusion resistance $R_{wet}$ of each of the unit cells 10 by the diffusion resistance detection section 533 in the fuel cell monitoring device 5 according to the exemplary embodiment shown in FIG. 1.

As shown in FIG. 6, the diffusion resistance detection section 533 is comprised of a resistance calculation section 533a, a limit current density calculation section 533b, a gas diffusion resistance calculation section 533c, a second diffusion resistance calculation section 533d, and a first diffusion resistance calculation section 533e.

The resistance calculation section 533a calculates a proton transfer resistance $R_{mem}$ and a gas reaction resistance $R_{ct}$ on the basis of an impedance of each of the unit cells 10 at every different frequency calculated by the impedance calculation section 532. The proton transfer resistance $R_{mem}$ is a component of a resistance-conversion of a resistance overvoltage which increases according to a dried state of the electrolyte 101 of the unit cell 10. The gas reaction resistance $R_{ct}$ is a component of a resistance conversion of an activation overvoltage and a concentration overvoltage.

The resistance calculation section 533a calculates the proton transfer resistance $R_{mem}$ of each of the unit cells 10 on the basis of a high frequency impedance corresponding to a high frequency selected from among the different frequencies. In addition, the resistance calculation section 533a calculates the gas reaction resistance $R_{ct}$ on the basis of an absolute value of a low frequency impedance, a phase angle and a proton transfer resistance $R_{mem}$ corresponding to a low frequency in the different frequencies.

A description will now be given of the method of calculating the proton transfer resistance $R_{mem}$ and the gas reaction resistance $R_{ct}$ of each of the unit cells 10 in the fuel cell 1 according to the exemplary embodiment with reference to FIG. 7 and FIG. 8.

Figure 7:
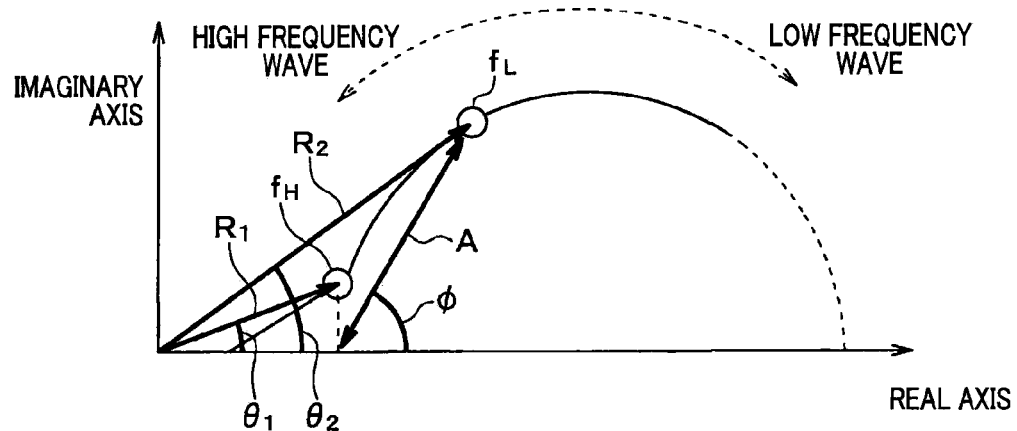
FIG. 7 is a characteristic view showing an impedance of the fuel cell in a complex plane when a frequency of an alternating current signal changes.

FIG. 7 is a characteristic view (Cole-Cole plot) showing an impedance of the fuel cell 10 in a complex plane when a frequency of an alternating current signal changes. FIG. 8 is another characteristic view (Cole-Cole plot) showing the impedance of the fuel cell 10 in a complex plane when the frequency of an alternating current signal is changed.

Figure 8:
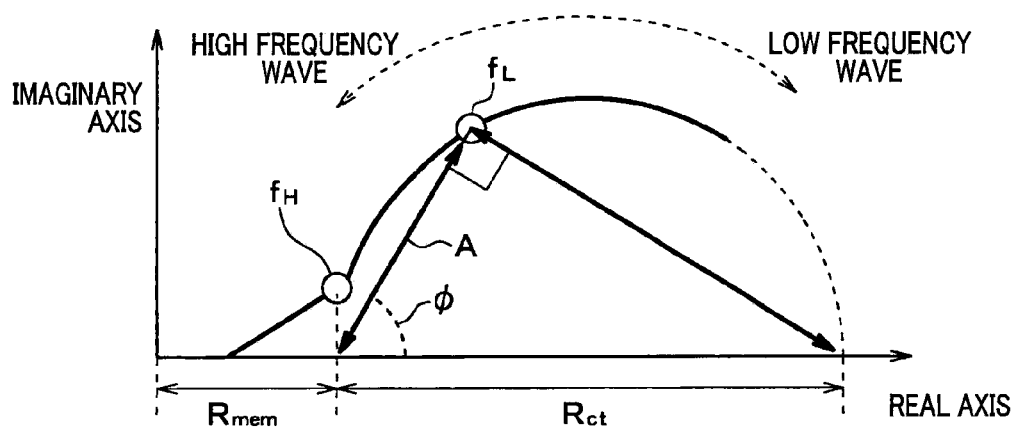
FIG. 8 is another characteristic view showing the impedance of the fuel cell in a complex plane when the frequency of an alternating current signal changes.

As shown in FIG. 7 and FIG. 8, a value in a real axis of the impedance at a high frequency $f_H$ in a complex plane corresponds to the proton transfer resistance $R_{mem}$ and the gas reaction resistance $R_{ct}$ corresponds to a value between two cross points of the trace of the impedance curve having an arc shape and the real axis in the complex plane.

Specifically, the proton transfer resistance $R_{mem}$ is calculated on the basis of an absolute value R1 and a phase angle $\theta_1$ of an impedance at a high frequency $f_H$ by using the following equation F1.

$$R_{mem} = R_1 \cos \theta_1 \tag{F1}$$

Further, a component showing the characteristics of the gas reaction resistance $R_{ct}$ in the impedance at a low frequency $f_L$ on the basis of the absolute values $R_1$ and $R_2$ at different frequencies $f_L$ and $f_H$ and the phase angle $\theta_2$ by using the following equations F2 and F3.

$$\phi = \tan^{-1}[(R_2 \sin \theta_2)/\{(R_2 \cos \theta_2) - R_{mem}\}] \tag{F2}$$

and $$A = (R_2 \sin \theta_2)/(R_2 \sin \phi) \tag{F3}$$

Finally, the gas reaction resistance $R_{ct}$ is calculated on the basis of the calculated values $\phi$ and A (which are obtained by the equations F2 and F3) by using the following equation F4.

$$R_{ct} = A/\cos \phi \tag{F4}$$

The limit current density calculation section 533b calculates the limit current density $I_{lim}$ when the fuel cell 1 generates electric power. The limit current density calculation section 533b calculates the limit current density $I_{lim}$ on the basis of the gas reaction resistance $R_{ct}$ and the concentration overvoltage $\eta_c$ generated in the unit cell 10, etc.

The limit current density calculation section 533b subtracts an output voltage (control voltage) E of the unit cell 10, the activation voltage and the resistance overvoltage from an ideal electromotive force $E_0$ in order to obtain the concentration overvoltage $\eta_c$.

In a concrete example, the limit current density $I_{lim}$ is calculated by the following equations F5 to F9.

$$I_{lim} = \{e^\beta/(e^\beta - 1)\} I \tag{F5}$$

$$\beta = (\eta_c nF)/(2RT) \tag{F6}$$

$$\eta_c = E_0 - E - \eta_a - \eta_R \tag{F7}$$

$$\eta_a = \{(RT)/(2\alpha F)\} \ln(I/Io) \tag{F8}$$

and $$\eta_R = I R_{mem} \tag{F9}$$

where F in the equations F5 to F9 indicates the Faraday constant, R designates a gas constant, T indicates a temperature, n indicates a constant, I indicates a current density, Io indicates an exchange current density, E is a control voltage, Eo designates an ideal electromotive force, $\eta_c$ denotes a concentration overvoltage, $\eta_a$ designates an activation overvoltage, $\eta_R$ designates a resistance overvoltage and $\alpha$ indicates an electric charge moving coefficient (a constant).

The gas diffusion resistance calculation section 533c calculates a gas diffusion resistance $R_{total}$ which is a parameter (s/m) indicating a difficulty to diffuse the reaction gas to the diffusion layers 102a and 102b, where the reaction gas is passing through the hydrogen gas passage 111 and the air passage 112 in the separator 110. The gas diffusion resistance $R_{total}$ contains the first diffusion resistance $R_{wet}$ and the second diffusion resistance $R_{dry}$ ($R_{total} = R_{wet}$ and $R_{dry}$). The first diffusion resistance $R_{wet}$ indicates the diffusion characteristics changed depending on the flooding and the second diffusion resistance $R_{dry}$ indicates diffusion characteristics changed depending on the dried-up.

The gas diffusion resistance calculation section 533c makes a function regarding correlation characteristics between the gas diffusion resistance $R_{total}$, the limit current density $I_{lim}$ and the gas reaction resistance $R_{ct}$. The gas diffusion resistance calculation section 533c calculates the gas diffusion resistance $R_{total}$ on the basis of the above function regarding correlation characteristics.

In a concrete example, the gas diffusion resistance calculation section 533c calculates the gas diffusion resistance $R_{total}$ on the basis of the limit current density $I_{lim}$ and the gas reaction resistance $R_{ct}$ by using the following equation F10.

$$R_{total} = \rho(I_{lim}/R_{ct})\xi \tag{F10}$$

The equation F10 is one of functional models regarding the correlation characteristics of the gas diffusion resistance $R_{total}$, the limit current density and the gas reaction resistance $R_{ct}$ obtained in advance.

In the equation F10, each of the gas reaction resistance $R_{ct}$ and the limit current density $I_{lim}$ is a function of the gas diffusion resistance $R_{total}$ and a gas concentration of the reaction gas. The equation F10 is obtained by subtracting the gas concentration of the reaction gas from each of these functions.

The values $\rho$ and $\xi$ in the equation F10 are parameters (constant values) obtained by fitting the previously-detected gas diffusion resistance and the estimated gas diffusion resistance, where the previously-detected gas diffusion resistance is detected on the basis of the limit current density when the gas concentration in the unit cell 10 is changed, and the estimated gas diffusion resistance is calculated by the gas reaction resistance $R_{ct}$ and the limit current density $I_{lim}$.

Next, the second diffusion resistance calculation section 533d calculates the second diffusion resistance $R_{dry}$, which shows the diffusion characteristics changed depending on the dried-up in the inside of the fuel cell 1 on the basis of the proton transfer resistance $R_{mem}$ calculated by the resistance calculation section 533a.

Similar to the proton transfer resistance $R_{mem}$, the second diffusion resistance $R_{dry}$, has characteristics which increase according to the reduction of the humidity RH in the inside of the fuel cell 1.

The proton transfer resistance $R_{mem}$ has a correlation to the humidity RH in the inside of the fuel cell 1, as shown in the following equation F11. Further, the second diffusion resistance $R_{dry}$ is in proportion to the reciprocal value of a diffusion coefficient $D_{dry}$ which has a correlation to the humidity RH in the inside of the fuel cell 1, as shown in the following equation F12.

$$RH \sim B(R_{mem})^c \quad (F11), \text{ and}$$

$$R_{dry} \sim D(p/D_{dry}) \quad (F12),$$

where the symbol "~" used in both the equations F11 and F12 indicates a proportionality sign, B and c used in the equation F11 indicate constant values, and D and p used in the equation F12 indicate thicknesses of the diffusion layers 103a and 103b, respectively.

The second diffusion resistance calculation section 533d calculates the humidity RH in the inside of the fuel cell 1 on the basis of the proton transfer resistance $R_{mem}$ by using the control map. This control map is stored in advance in the memory 530, and defines the correlation between the proton transfer resistance $R_{mem}$ and the humidity RH in the inside f the fuel cell 1

The second diffusion resistance calculation section 533d calculates the second diffusion resistance $R_{dry}$ on the basis of the humidity RH in the inside of the fuel cell 1 previously calculated by using the control map and the equation F12. This control map is stored in advance in the memory 530 and defines a correlation between the humidity RH in the inside of the fuel cell 1 and the diffusion coefficient $D_{dry}$.

The first diffusion resistance calculation section 533e subtracts the second diffusion resistance $R_{dry}$ from the gas diffusion resistance $R_{total}$ and calculates the first diffusion resistance $R_{wet}$, showing diffusion characteristics changed depending on the flooding in the inside of the fuel cell 1.

The first diffusion resistance calculation section 533e subtracts the second diffusion resistance $R_{dry}$ calculated by the second diffusion resistance calculation section 533d from the gas diffusion resistance $R_{total}$ calculated by the gas diffusion resistance calculation section 533c, and obtains the subtraction result as the first diffusion resistance $R_{wet}$ ($=R_{total} R_{dry}$).

The water content calculation section 534 converts the first diffusion resistance $R_{wet}$ of each of the unit cells 10 calculated by the diffusion resistance detection section 533 to the water content in each of the unit cells 10. The water content calculation section 534 is configured to store the calculated water content of each of the unit cells 10 into the memory 530.

Figure 9:
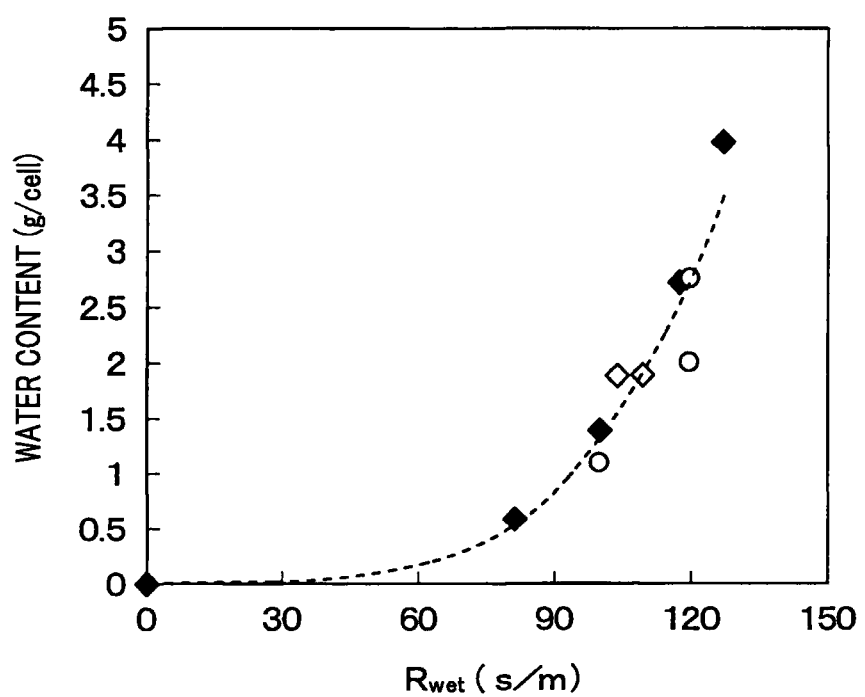
FIG. 9 is a characteristic view showing a relationship between a water content and a first diffusion resistance in a unit cell in the fuel cell.

FIG. 9 is a characteristic view showing a relationship between the water content and the first diffusion resistance in each unit cell 10 in the fuel cell 1.

As shown in FIG. 9, the water content calculation section 534 calculates the water content W in each of the unit cells 10 on the basis of the first diffusion resistance $R_{wet}$ by using the following approximation equation F13. The approximation equation F13 is previously obtained on the basis of the detection results of the water content in each of the unit cells 10 when the first diffusion resistance $R_{wet}$ is changed in each of the unit cells 10, as shown in FIG. 9.

$$W = 10^{-8}R_{wet}^4 - 10^{-7}R_{wet}^3 - 10^{-5}R_{wet}^2 + 7 \times R_{wet}^{-4} \quad (F13).$$

A description will now be given of the control section 54 in the fuel cell monitoring device 5 with reference to FIG. 1.

The control section 54 performs the control process and the arithmetic process on the basis of various types of the received input signals. The control section 54 is a microcomputer and peripheral devices. The microcomputer is widely known and substantially comprised of a central processing unit (CPU) and various types of memories 54a forming a memory section.

The signal processing section 53 is connected to the input side of the control section 54. The control section 54 receives the output signals transmitted from various types of the input devices. The output side of the control section 54 is connected to various types of electric actuators such as the air pump 22, the water pump 41, the air adjustment valve 23, the electromagnetic valve 24, the hydrogen gas adjustment valve 33, and the electromagnetic valve 34. The control section 54 outputs various control signals to these electric actuators to control the operation thereof.

The control section 54 in the fuel cell monitoring device 5 according to the exemplary embodiment performs the power generation control process in order to control the fuel cell 1 to generate the required output. In addition, the control section 54 is configured to perform the water content recovery process for adjusting that the water content in the fuel cell 1 becomes within an optimum water content range. That is, a power generation control section 54b shown in FIG. 1 corresponds to the structure in the control section 54 to perform the power generation control process. Further, a recovery control section 54c shown in FIG. 1 corresponds to the structure in the control section 54 to perform the water content recovery process.

A description will now be given of the fuel cell monitoring process performed by the fuel cell monitoring device 5 with reference to FIG. 10.

Figure 10:
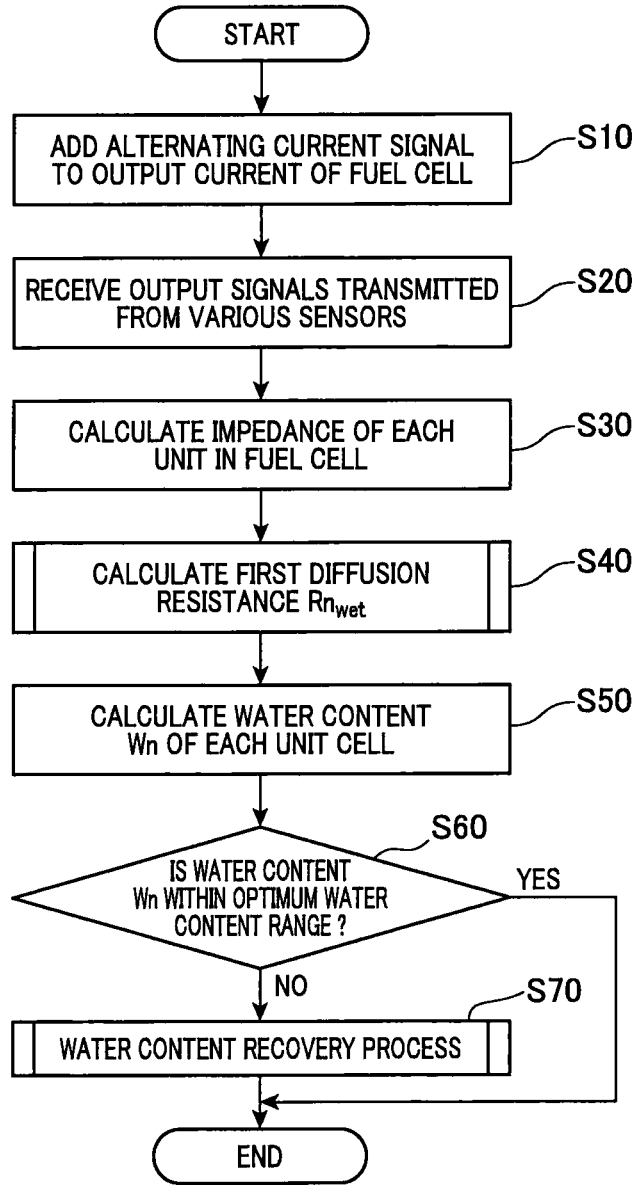
FIG. 10 is a flow chart showing a fuel cell monitor process performed by the fuel cell monitoring device according to the exemplary embodiment of the present invention.

FIG. 10 is a flow chart showing the fuel cell monitor process performed by the fuel cell monitoring device 5 according to the exemplary embodiment.

The signal processing section 53 and the control section 54 periodically perform the fuel cell monitor process shown in FIG. 10 on the basis of the power generation condition of the fuel cell 1.

As shown in FIG. 10, through the DC-DC converter 2, the signal superposing section 531 in the signal processing section 53 in the fuel cell monitoring device 5 superimposes the alternating current signal of an alternating current signal of a predetermined high frequency and an alternating current signal of a predetermined low frequency on the output current of the fuel cell 1 (step S10). The operation flow goes to step S20.

In step S20, the signal processing section 53 receives the output signal (as a detection signal) transmitted from the current detection section 51 and the output signal (as a detection signal) transmitted from the voltage detection section 52 when the signal superposing section 531 superimposes the alternating current signal on the output current of the fuel cell 1. The operation flow goes to step S30.

In step S30, the impedance calculation section 532 in the signal processing section 53 calculates the impedance of each of the unit cells 10 corresponding to different frequencies. The operation flow goes to step S40.

In step S40, the diffusion resistance detection section 533 in the signal processing section 53 calculates the first diffusion resistance $R1_{wet}$, $R2_{wet}$, . . . , and $Rn_{wet}$ of each of the unit cells 10 (n is a cell number of the unit cells 10).

A description will now be given of the detailed explanation of the process in step S40 with reference to FIG. 11.

Figure 11:
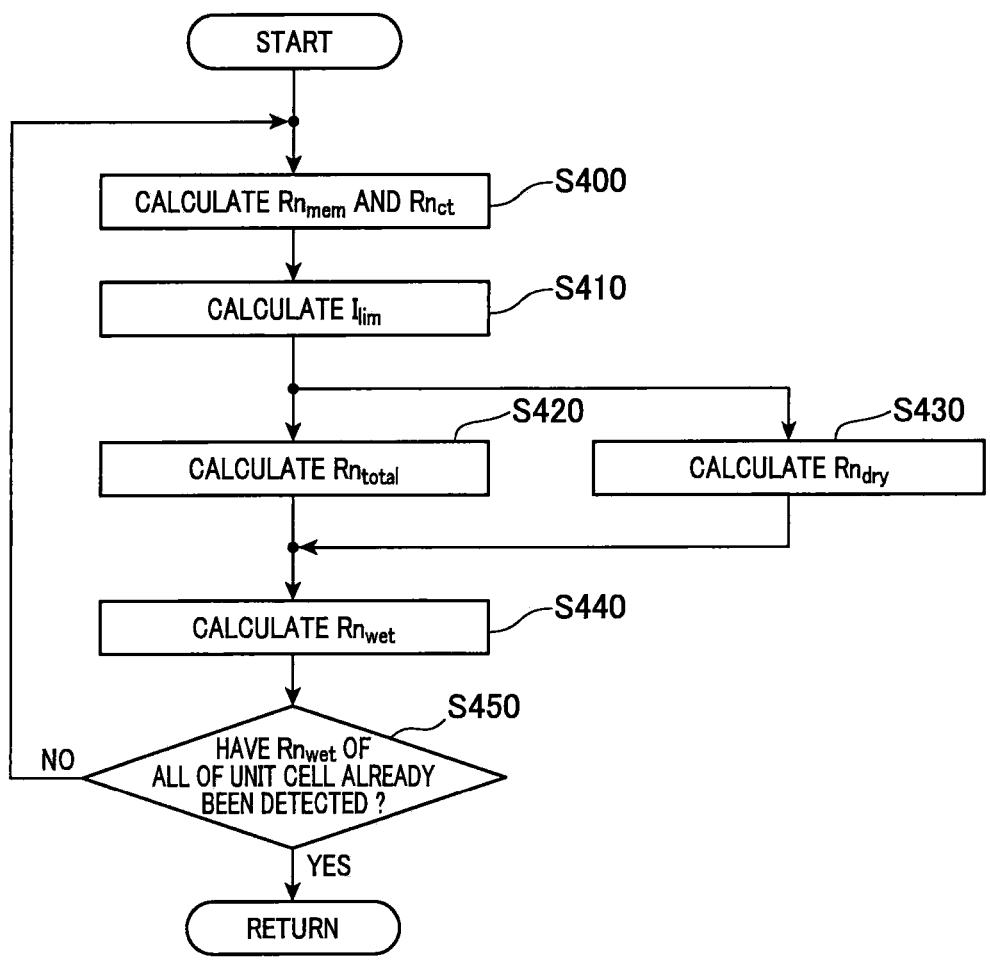
FIG. 11 is a flow chart showing a process of detecting the first diffusion resistance of each of the unit cells in the fuel cell performed by the fuel cell monitoring device according to the exemplary embodiment of the present invention.

FIG. 11 is a flow chart showing a process of detecting the first diffusion resistance of each of the unit cells 10 in the fuel cell 1 performed by the fuel cell monitoring device 5 according to the exemplary embodiment.

As shown in FIG. 11, the resistance calculation section 533a in the diffusion resistance detection section 533 calculates the proton transfer resistance $R1_{mem}$, $R2_{mem}$, . . . , $Rn_{mem}$ and the gas reaction resistance $R1_{ct}$, $R2_{ct}$, ..., $Rn_{ct}$ of each of the unit cells 10 (step S400). The operation flow goes to step S410.

In step S410, the limit current density calculation section 533*b* in the diffusion resistance detection section 533 calculates the limit current density $I_{lim}$. The operation flow goes to step S420.

In step S420, the gas diffusion resistance calculation section 533*c* in the diffusion resistance detection section 533 calculates the gas diffusion resistance $R1_{total}$, $R2_{total}$, ... $Rn_{total}$ of each of the unit cells 10 on the basis of the gas reaction resistance $R_{ct}$ and the limit current density $I_{lim}$. The operation flow goes to step S430.

In step S430, the second diffusion resistance calculation section 533*d* in the diffusion resistance detection section 533 calculates the second diffusion resistance $R1_{dry}$, $R2_{dry}$, ..., $Rn_{dry}$ of each of the unit cells 10. The operation flow goes to step S440.

In step S440, the first diffusion resistance calculation section 533*e* in the diffusion resistance detection section 533 subtracts the second diffusion resistance $R1_{dry}$, $R2_{dry}$, ..., $Rn_{dry}$ of each of the unit cells 10 calculated in step S430 from the gas diffusion resistance $R1_{total}$, $R2_{total}$, ..., $Rn_{total}$ of each of the unit cells 10 calculated in step S420 to obtain the first diffusion resistance $R1_{wet}$, $R2_{wet}$, ..., $Rn_{wet}$ of each of the unit cells 10. The operation flow goes to step S450.

In step S450, the diffusion resistance detection section 533 judges whether or not the first diffusion resistance $R1_{wet}$, $R2_{wet}$, ..., $Rn_{wet}$ of all of the unit cells 10 have been calculated. When the judgment result in step S450 indicates affirmation ("YES" in step S450), the operation shown in the flow chart shown in FIG. 11 is completed and the operation flow goes to step S50 from the step S40 shown in FIG. 10.

On the other hand, when the judgment result in step S450 indicates negation ("NO" in step S450), the operation flow returns to step S400. The processes in step S400 to step S450 are repeated until the first diffusion resistance $R1_{wet}$, $R2_{wet}$, ..., and $Rn_{wet}$ of all of the unit cells 10 have been calculated.

When the process in step S40 is correctly completed, the operation flow goes to step S50.

In step S50, the water content calculation section 534 in the signal processing section 53 calculates the water content W (W1, W2, ..., Wn) of each of the unit cells 10 on the basis of the first diffusion resistance $R1_{wet}$, $R2_{wet}$, ..., and $Rn_{wet}$ of all of the unit cells 10. The operation flow goes to step S60.

Figure 12:
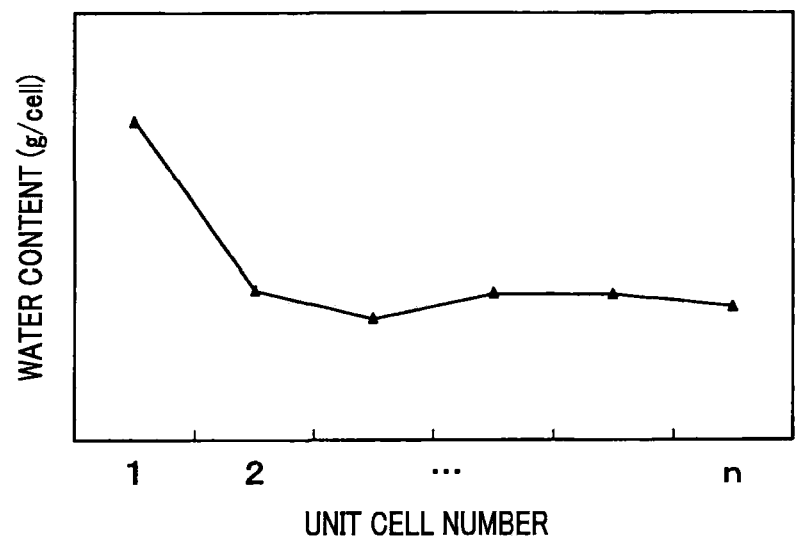
FIG. 12 is a view showing a water content of each of the unit cells in the fuel cell.
Figure 13:
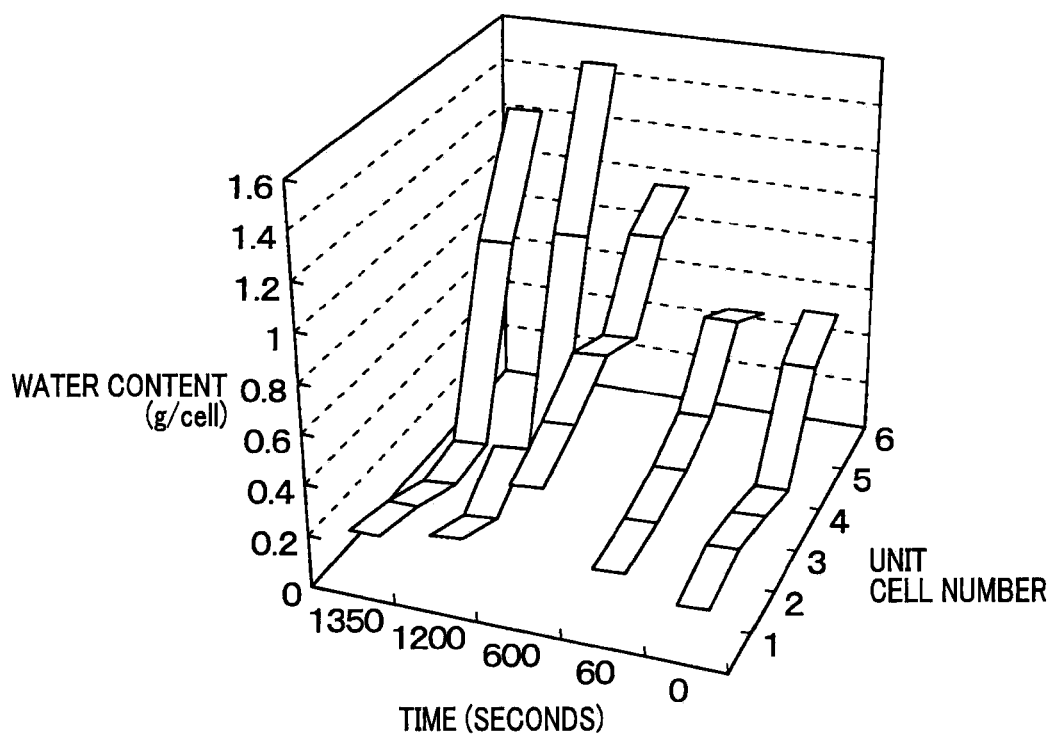
FIG. 13 is a view showing a change in time of the water content in the unit cell of the fuel cell.

FIG. 12 is a view showing a water content (g/cell) of each of the unit cells 10 in the fuel cell 1. FIG. 13 is a view showing a change in time of the water content in the unit cell 10 of the fuel cell 1.

In the fuel cell monitoring device 5 according to the exemplary embodiment, the water content calculation section 534 in the signal processing section 53 judges whether or not the water content W (W1, W2, Wn) (see FIG. 12) of each of the unit cells 10 is within an optimum water content range. The optimum water content range has been determined so that the fuel cell 1 can generate and output the required power. The water content calculation section 534 generates a water content map (see FIG. 13) on the basis of the calculated water content W1, W2, Wn (g/cell) of each of the unit cells 10. As shown in FIG. 13, the water content map shows the time-series water contents (g/cell) of each of the unit cells 10.

When the judgment result in step S60 indicates affirmation ("YES" in step S60), that is, it is satisfied that all of the water content W1 to Wn in each of the unit cells 10 is within the predetermined allowable water content range, the processes in the flow chart shown in FIG. 10 is completed.

On the other hand, when the judgment result in step S60 indicates negation ("NO" in step S60), i.e. when it is not satisfied that all of the water content W (W1, W2, Wn) in each of the unit cells 10 is within the predetermined allowable water content range, the operation flow goes to step S70.

Figure 14:
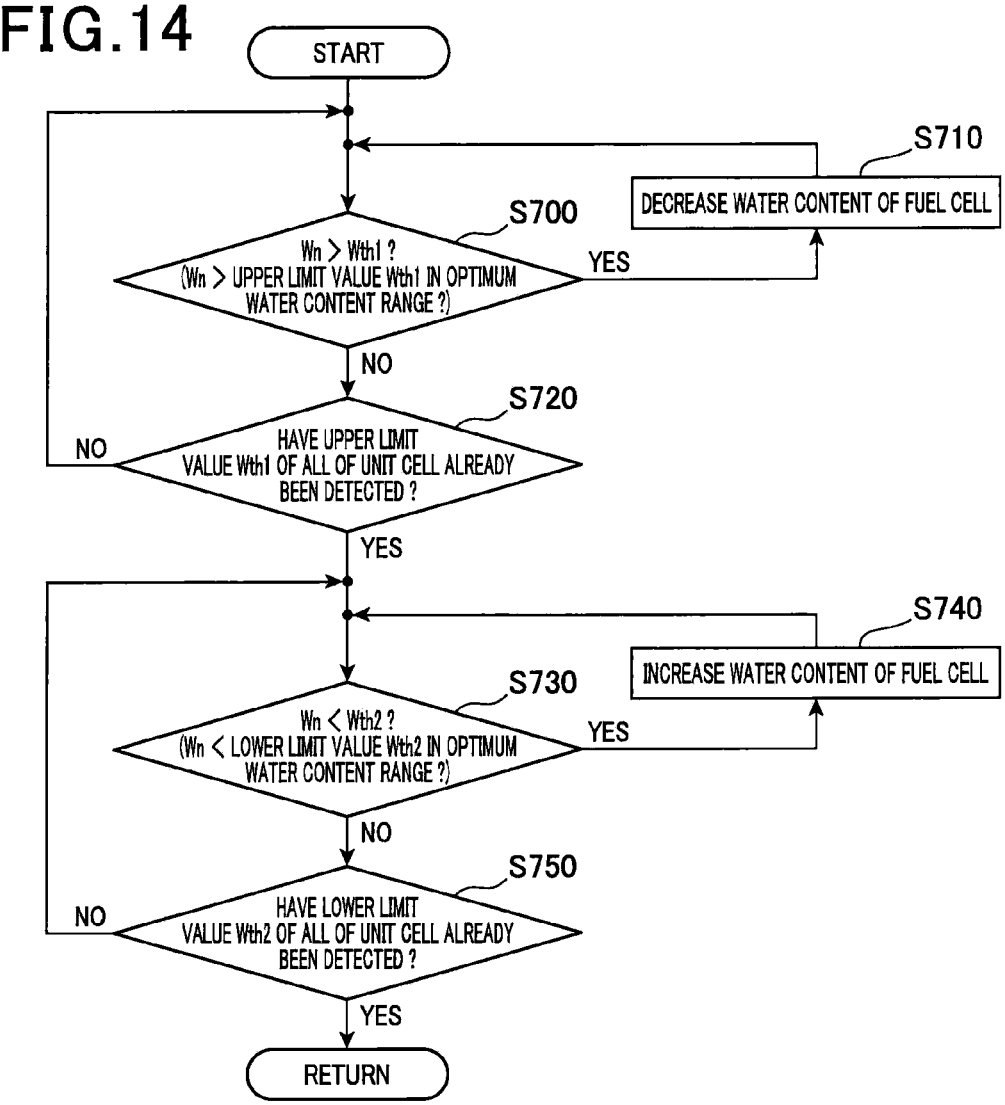
FIG. 14 is a view showing a flow chart showing a water content recovery process performed by the fuel cell monitoring device according to the exemplary embodiment of the present invention.

In step S70, the control section 54 performs the water content recovery process shown in FIG. 14.

A description will now be given of the water content recovery process with reference to FIG. 14.

FIG. 14 is a view showing a flow chart showing a water content recovery process performed by the fuel cell monitoring device according to the exemplary embodiment.

As shown in FIG. 14, the control section 54 judges whether or not the water content W (W1, W2, Wn) in each of the nit cells 10 exceeds the upper limit value Wth1 in the optimum water content range (step S700).

When the judgment result in step S700 indicates affirmation ("YES" in step S700), that is, the water content W (W1, W2, Wn) in at least a part of the unit cells 10 exceeds the upper limit value Wth1 in the predetermined allowable water content range, the operation flow goes to step S710. In step S710, the control section 54 performs the process of decreasing the water content of the unit cells 10.

Figure 15:
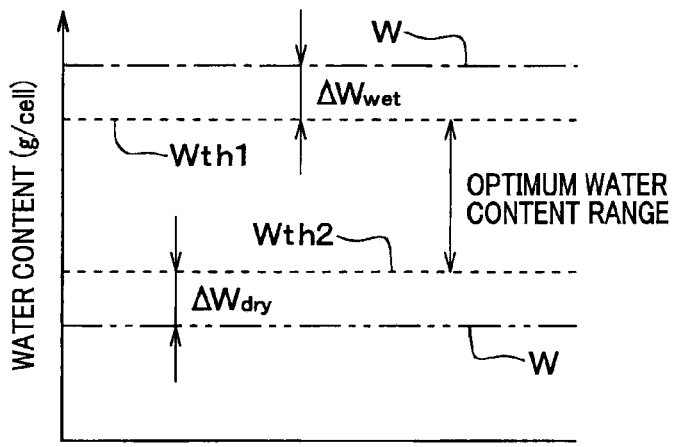
FIG. 15 is a view explaining the water content recovery process performed by a control section in the fuel cell monitoring device according to the exemplary embodiment of the present invention.

FIG. 15 is a view explaining the water content recovery process performed by the control section 54 in the fuel cell monitoring device 5 according to the exemplary embodiment.

Specifically, as shown in FIG. 15, the control device 54 subtracts the water content W of the unit cell 10 from the upper limit value Wth1 to obtain a necessary water discharge amount $\Delta W_{wet}$ which is necessary to be discharged from the unit cell 10. The necessary water discharge amount $\Delta W_{wet}$ is a difference between the upper limit value Wth1 and the water content W (W1, W2, ..., Wn, where n is a cell number) of each of the unit cells 10.

The control section 54 determines a target pressure difference $\Delta P$ in pressure between the air inlet section 11*a* and the air outlet section 11*b*, and between the hydrogen gas inlet section 12*a* and the hydrogen gas outlet section 12*b*. The target pressure difference $\Delta P$ is necessary for discharging water of a necessary water discharge amount $\Delta W_{wet}$ from the unit cell 10.

Figure 16:
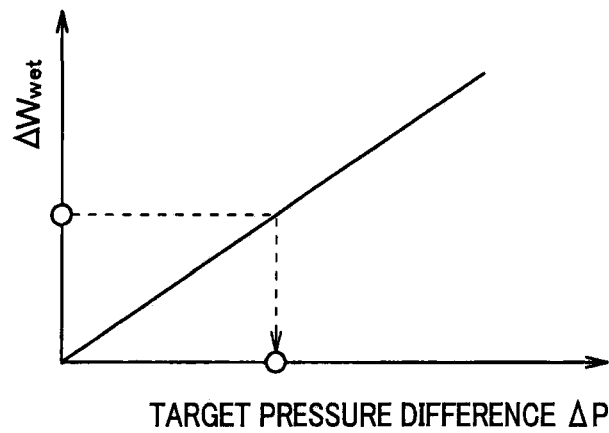
FIG. 16 is a view showing a control map which shows a relationship between a necessary water discharge amount $\Delta W_{wet}$ and a target pressure difference $\Delta P$ used by the fuel cell monitoring device according to the exemplary embodiment of the present invention.

FIG. 16 is a view showing a control map which shows a relationship between the necessary water discharge amount $\Delta W_{wet}$ and the target pressure difference $\Delta P$ used by the fuel cell monitoring device 5 according to the exemplary embodiment.

The control section 54 according to the exemplary embodiment determines the target pressure difference $\Delta P$ by using a control map (see FIG. 16) so that the target pressure difference $\Delta P$ is increased according to the increasing of the water discharge amount $\Delta W_{wet}$.

The control section 54 controls the air pressure adjustment valve 23 and the hydrogen gas adjustment valve 33 so that a difference in pressure between the air inlet section 11*a* and the air outlet section 11*b* is temporarily increased to the target pressure difference $\Delta P$, and a difference in pressure between the hydrogen gas inlet section 12*a* and the hydrogen gas outlet section 12*b* is temporarily increased to the target pressure difference $\Delta P$. This control makes it possible to discharge excess water from the fuel cell 1 and decrease the water content in the inside of the fuel cell 1.

The judgment result in step S700 indicates negation ("NO" in step S700), the operation flow goes to step S720.

In step S720, the control section 54 judges whether or not the judgment regarding the upper limit value Wth1 of all of the unit cells 10 has been completed.

When the judgment result in step S720 indicates negation ("NO" in step S720), the operation flow returns to step S700 in order to perform the judgment of the remained unit cells 10.

On the other hand, when the judgment result in step S720 indicates affirmation ("YES" in step S720), the operation flow goes to step S730. In step S730, the control section 54 judges whether or not the water content W (W1, W2, ..., Wn) in each of the unit cells 10 is below the lower limit value Wth2 in the predetermined allowable water content range.

When the judgment result in step S730 indicates affirmation ("YES" in step S730), i.e. when at least a part of the unit cells 10 has a water content W (W1, W2, Wn) which is below the lower limit value Wth2 in the predetermined allowable water content range, the operation flow goes to step S740. In step S740, the control section 54 decreases a temperature of the fuel cell 1 to increase the water content of the fuel cell 1.

Specifically, as shown in FIG. 15, the control section 54 subtracts the lower limit value Wth2 from the water content W of the unit cell 10 to obtain a necessary water content $W_{dry}$ of the unit cell 10. That is, the necessary water content $W_{dry}$ is a difference between the water content W of the unit cell 10 and the lower limit value Wth2 in the predetermined allowable water content range.

Figure 17:
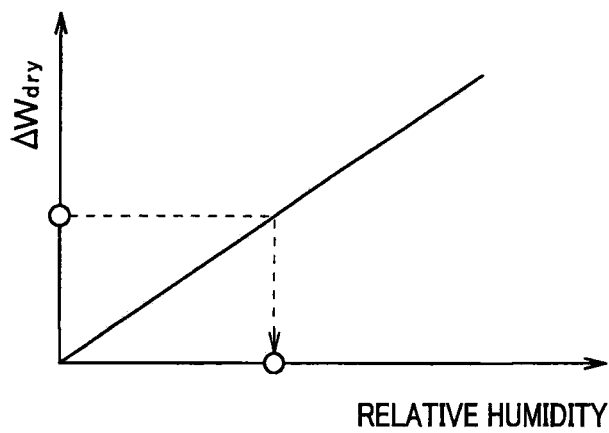
FIG. 17 is a view showing a control map which shows a relationship between a necessary water content $W_{dry}$ and a relative humidity used in the water content recovery process performed by the fuel cell monitoring device according to the exemplary embodiment of the present invention.
Figure 18:
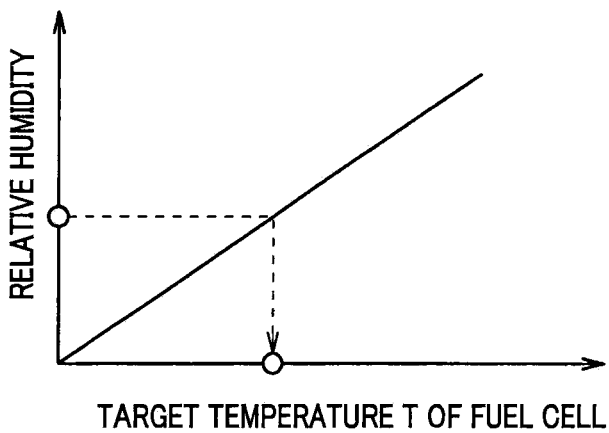
FIG. 18 is a view showing another control map which shows a relationship between the necessary water content and a target temperature T of the fuel cell used in the water content recovery process performed by the fuel cell monitoring device according to the exemplary embodiment of the present invention.

FIG. 17 is a view showing a control map which shows a relationship between a necessary water content $W_{dry}$ and a relative humidity used in the water content recovery process performed by the fuel cell monitoring device 5 according to the exemplary embodiment. FIG. 18 is a view showing a control map which shows a relationship between the necessary water content $W_{dry}$ and a target temperature T of the fuel cell 1 used in the water content recovery process performed by the fuel cell monitoring device 5 according to the exemplary embodiment.

The control section 54 converts the necessary water content $W_{dry}$ to a relative humidity by using the control map shown in FIG. 17. The control map shown in FIG. 17 shows the relationship between the necessary water content $W_{dry}$ and the relative humidity. The control section 54 determines a target temperature T of the fuel cell 1 on the basis of the obtained relative humidity.

The control section 54 in the fuel cell monitoring device 5 according to the exemplary embodiment determines the target temperature T of the fuel cell 1 on the basis of the control map shown in FIG. 18. The control map shown in FIG. 18 shows a relationship between the necessary water discharge amount $\Delta W_{wet}$ and the target temperature T of the fuel cell 1.

The control section 54 controls the water pump 41 so that a temperature of the inside of the fuel cell 1 decreases to the target temperature T of the fuel cell 1. This control process makes it possible to increase the water content of the fuel cell 1 because of vapor in the fuel cell 1 which has condensed to water.

When the judgment result in step S730 indicates negation "NO" in step S750), i.e., the water content of each unit cell 10 is not less than the lower limit value Wth2 in the predetermined allowable water content range, the operation flow goes to step S750. In step S750, the control section 54 judges whether or not the judgment regarding the upper limit value Wth1 of all of the unit cells 10 has been completed.

When the judgment result in step S750 indicates negation ("NO" in step S750), the operation flow returns to step S730 in order to perform the judgment of the remained unit cells 10.

On the other hand, when the judgment result in step S750 indicates affirmation ("YES" in step S750), the control section 54 completes the water content recovery process of the flow chart shown in FIG. 14.

As previously described in detail, the fuel cell monitoring device 5 according to the exemplary embodiment subtracts the second diffusion resistance $R_{dry}$ from the gas diffusion resistance $R_{total}$ in order to obtain the first diffusion resistance $R_{wet}$. This process makes it possible to detect the diffusion characteristics, as the first diffusion resistance $R_{wet}$, which varies depending on the flooding in the inside of the fuel cell 1. As a result, this makes it possible to detect the excess state of the water content in the inside of the fuel cell 1 with high accuracy.

Further, the fuel cell monitoring device 5 according to the exemplary embodiment has the water content calculation section 534 which calculates the water content in the inside of the fuel cell 1 on the basis of the first diffusion resistance $R_{wet}$. It is accordingly possible for the fuel cell monitoring device 5 to monitor the water content of the inside of the fuel cell 1 and precisely detect an excess state of the water content in the inside of the fuel cell 1 on the basis of the water content of the inside of the fuel cell 1 calculated by the water content calculation section 534.

In particular, the diffusion resistance detection section 533 in the fuel cell monitoring device 5 calculates the first diffusion resistance $R_{wet}$ of each of the unit cells 10, and the water content calculation section 534 in the fuel cell monitoring device 5 calculates the water content in a stacked direction of the unit cells 10 in the fuel cell 1. This makes it possible to obtain a distribution of the water content of the inside of the fuel cell 1 in a stacked direction of the unit cells 10. It is further possible to detect an excess water content of a part of the unit cells 10 with high accuracy.

Still further, the control section 54 in the fuel cell monitoring device 5 is configured to perform the water content recovery process so that the water content in the inside of the fuel cell 1 is set within the predetermined allowable water content range.

Because the control section 54 controls the fuel cell 1 to have the water content within the predetermined allowable water content range, it is possible to suppress fluctuation of the output of the fuel cell 1, and to operate the fuel cell 1 with high efficiency and to increase the fuel consumption of the fuel cell 1.

Other Modifications

The concept of the present invention is not limited by the exemplary embodiment previously described. It is possible for the fuel cell monitoring device 5 to have the following modifications (1) to (17).

(1) The exemplary embodiment previously described shows that the second diffusion resistance calculation section 533d calculates the second diffusion resistance $R_{dry}$ on the basis of the proton transfer resistance $R_{mem}$. However, the concept of the present invention is not limited by this. For example, a humidity sensor is used to detect a humidity of the inside of the fuel cell 1, and the second diffusion resistance $R_{dry}$ can be calculated on the basis of the detected humidity in the fuel cell 1.

(2) The exemplary embodiment previously described shows that the water content calculation section 534 calculates the water content W (W1, W2, . . . , Wn) of the inside of each of the unit cells 10 in the fuel cell 1 on the basis of the first diffusion resistance $R_{wet}$ by using the approximation equation F13. However, the concept of the present invention is not limited by this. For example, it is possible to calculate the water content W (W1, W2, . . . , Wn) of each of the unit cells 10 by using a control map. This control map which shows a relationship between the first diffusion resistance $R_{wet}$ and the water content W and is previously prepared and stored in the memory 530.

(3) The exemplary embodiment previously described shows that the control section 54 in the fuel cell monitoring device 5 performs the water content recover process of increasing a difference in pressure between the air inlet section 11a and the air outlet section 11b or between the hydrogen gas inlet section 12a and the hydrogen gas outlet section 12b in the fuel cell 1 in the fuel cell 1 in order to decrease the water content in the inside of the fuel cell 1. However, the concept of the present invention is not limited by this. For example, it is possible to decrease the water content of the inside of the fuel cell 1 by intermittently increasing the opening ratio of the electromagnetic valve 24.

(4) The exemplary embodiment previously described shows that the control section 54 in the fuel cell monitoring device 5 performs the water content recover process of increasing the water content of the inside of the fuel cell 1 by decreasing the temperature of the fuel cell 1. However, the concept of the present invention is not limited by this. For example, it is possible to increase the water content of the inside of the fuel cell 1 by decreasing the air supply amount from the air pump 22 and decreasing a stoichiometric ratio of the air, or by adding a humidity to the air supplied to the inside of the fuel cell 1.

(5) As previously described, it is preferable for the fuel cell monitoring device 5 to have the water content calculation section 534 in order to directly monitor the correct water content of the inside of the fuel cell 1. However, the concept of the present invention is not limited by this. For example, it is possible to obtain indirectly the water content of the inside of the fuel cell 1 on the basis of the first diffusion resistance $R_{wet}$ without using the water content calculation section 534.

(6) It is necessary for the control section 5 to perform the water content recovery process in order to operate the fuel cell 1 with high efficiency. However, the concept of the present invention is not limited by this. For example, it is also sufficient to detect that the water content of the inside of the fuel cell 1 deviates from the predetermined allowable water content range, and for the control device 5 to give warning regarding the occurrence of the deviation to the driver of a vehicle equipped with the fuel cell system.

(7) It is preferable for the control section 54 to perform both the process of decreasing and the process of increasing the water content of the inside of the fuel cell 1. However, the concept of the present invention is not limited by this. For example, it is acceptable to perform one selected from the processes of decreasing and increasing the water content of the inside of the fuel cell 1.

It is preferable for the diffusion resistance detection section 533 to detect the first diffusion resistance $R_{wet}$ of each of the unit cells 10 and, for the water content calculation section 534 to calculate the water content of each of the inside of the unit cells 10. However, the concept of the present invention is not limited by this. For example, it is acceptable to calculate the first diffusion resistance $R_{wet}$ and the water content W of each of one or more specific unit cells 10.

In this case, the voltage detection section 52 is not required to detect an output voltage of each of the unit cells 10. It is accordingly possible to form the voltage detection section by using the voltage sensor which detects an output voltage of the whole unit cells of the fuel cell 1 or the voltage sensor which detects an output voltage of a part of the unit cells 10.

(9) The exemplary embodiment previously described uses the current detection section 51 as the current detection section capable of detecting a current flowing through a part of the unit cells 10. However, the concept of the present invention is not limited by this. For example, it is also possible to use a current detection section which detects an output current of the whole unit cells 10 of the fuel cell 1.

(10) The exemplary embodiment previously described shows the example of calculating the gas diffusion resistance $R_{total}$ on the basis of the equation F10 which shows the function regarding the correlation characteristics between the gas diffusion resistance $R_{total}$, the limit current density $I_{lim}$ and the gas reaction resistance $R_{ct}$. However, the concept of the present invention is not limited by this.

For example, it is acceptable to prepare a control map regarding the correlation characteristics between the gas diffusion resistance $R_{total}$, the limit current density and $I_{lim}$ the gas reaction resistance $R_{ct}$, and calculate the gas diffusion resistance $R_{total}$ on the basis of the limit current density $I_{lim}$ and the gas reaction resistance $R_{ct}$ while referring to the control map.

(11) The exemplary embodiment previously described shows the example of calculating proton transfer resistance $R_{mem}$ on the basis of the absolute value R1 and a phase angle $\theta_1$ of the impedance at a high frequency $f_H$. However, the concept of the present invention is not limited by this. For example, it is possible to use as the proton transfer resistance $R_{mem}$ the absolute value R1 of the impedance and at the high frequency $f_H$ when the phase angle $\theta_1$ of the impedance at the high frequency $f_H$ is a small value.

(12) The exemplary embodiment previously described shows the example of calculating the gas reaction resistance $R_{ct}$ by using the equations F2, F3 and F4, where the gas reaction resistance $R_{ct}$ corresponds to a value between two cross points of the trace of the impedance curve having an arc shape and the real axis in the complex plane. However, the concept of the present invention is not limited by this.

For example, as shown in the following equation, it is possible to calculate the gas reaction resistance $R_{ct}$ by eliminating the influence of the activation overvoltage because the activation overvoltage affects the value between the two cross points of the trace of the impedance curve having an arc shape and the real axis in the complex plane.

$$R_{ct} = A/\cos \phi - \eta_a/I,$$

where $\eta_a$ designates the activation overvoltage and I indicates the current density. By the way, the activation overvoltage $\eta_a$, can be calculated by using the equation F8 as previously described.

(13) The exemplary embodiment previously described shows the example of applying the fuel cell monitoring device 5 to the fuel cell system equipped with the fuel cell 1 in which the plural of the unit cells 10 are electrically connected in series. However, the concept of the present invention is not limited by this. For example, it is possible to apply the fuel cell monitoring device 5 to the fuel cell composed of a single unit cell 10 and the fuel cell composed of plural unit cells 10 which are electrically connected in parallel.

(14) The exemplary embodiment previously described shows the example in which the fuel cell monitoring device 5 according to the exemplary embodiment is applied to the fuel cell 1 mounted to fuel cell vehicles as one type of electric vehicles. However, the concept of the present invention is not limited by this. For example, it is possible to apply the fuel cell monitoring device 5 to various types of fuel cells to be used for factories and home.

(15) It is possible to eliminate non-essential components from the fuel cell monitoring device 5 according to the exemplary embodiment, or replace them with other components, unless otherwise noted.

(16) It is possible to replace, with other values, the number, the values, the amount and the range explained in the description regarding the fuel cell monitoring device 5 according to the exemplary embodiment previously described, unless otherwise noted.

(17) It is possible to use other shapes and positions instead of the shapes and positions used in the description regarding the fuel cell monitoring device 5 according to the exemplary embodiment previously described, unless otherwise noted.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A fuel cell monitoring device which monitors a fuel cell comprising one or more unit cells capable of performing electrochemical reaction of reaction gas comprised of fuel gas and oxidizing gas to generate electric power when receiving the reaction gas, the fuel cell monitoring device comprising:
   a current detection section configured to detect an output current of the fuel cell;
   a voltage detection section configured to detect an output voltage of each of the unit cells;
   a signal superposing section configured to superimpose a signal of a different frequency on an output signal of the fuel cell;
   an impedance calculation section configured to calculate and map an impedance at every frequency on a basis of the output current detected by the current detection section and the output voltage detected by the voltage detection section when the signal superposing section superimposes the signal at every frequency on the output signal of the fuel cell; and
   a diffusion resistance detection section configured to calculate and map a first diffusion resistance showing diffusion characteristics which vary due to a flooding in the inside of the fuel cell, and
   the diffusion resistance detection section comprising:
      a resistance calculation section configured to calculate and map a proton transfer resistance and a gas reaction resistance on a basis of the impedance at every frequency calculated by the impedance calculation section;
      a gas diffusion resistance calculation section configured to calculate and map a gas diffusion resistance which shows a difficulty of diffusing the reaction gas in the inside of the fuel cell;
      a second diffusion resistance calculation section configured to calculate and map a second diffusion resistance, on a basis of the proton transfer resistance, showing the diffusion characteristics varying due to a dried-up state in the inside of the fuel cell; and
      a first diffusion resistance calculation section configured to calculate the first mapped diffusion resistance by subtracting the second mapped diffusion resistance from the gas diffusion resistance,
   the fuel cell monitoring device detects an excess state of water content in a fuel cell on the basis of the calculated first diffusion resistance, such that the fuel cell monitoring device operates in an optimum water content range.

2. The fuel cell monitoring device according to claim 1, wherein the second diffusion resistance calculation section converts the proton transfer resistance to a humidity in the inside of the fuel cell, and calculates the second diffusion resistance on the basis of the obtained humidity.

3. The fuel cell monitoring device according to claim 1, further comprising a water content calculation section configured to calculate a water content in the inside of the fuel cell on the basis of the first diffusion resistance.

4. The fuel cell monitoring device according to claim 2, further comprising a water content calculation section configured to calculate a water content in the inside of the fuel cell on the basis of the first diffusion resistance.

5. The fuel cell monitoring device according to claim 3, wherein
   the fuel cell comprises a plurality of the unit cells electrically connected in series,
   the voltage detection section is configured to detect the output voltage of each of the unit cells,
   the impedance calculation section is configured to calculate the impedance at a different frequency of each of the unit cells,
   the diffusion resistance detection section is configured to calculate the first diffusion resistance of each of the unit cells, and
   the water content calculation section is configured to calculate the water content in each of the unit cells in the fuel cell.

6. The fuel cell monitoring device according to claim 4, wherein
   the fuel cell comprises a plurality of the unit cells electrically connected in series,
   the voltage detection section is configured to detect the output voltage of each of the unit cells,
   the impedance calculation section is configured to calculate the impedance at a different frequency in each of the unit cells,
   the diffusion resistance detection section is configured to calculate the first diffusion resistance of each of the unit cells, and
   the water content calculation section is configured to calculate the water content in each of the unit cells in the fuel cell.

7. The fuel cell monitoring device according to claim 5, further comprising a recovery control section configured to perform a water content recovery process so that the water content in the inside of the fuel cell becomes within the optimum water content range when the water content of the inside of the fuel cell calculated by the water content calculation section is out of the optimum water content range.

8. The fuel cell monitoring device according to claim 6, further comprising a recovery control section configured to perform a water content recovery process so that the water content in the inside of the fuel cell becomes within the optimum water content range when the water content of the inside of the fuel cell calculated by the water content calculation section is out of the optimum water content range.

9. The fuel cell monitoring device according to claim 7, wherein when the calculated water content in the inside of the fuel cell exceeds the optimum water content range, the recovery control section calculates a necessary water discharge amount on the basis of a difference between an upper limit value of the optimum water content range and the water content in the inside of the fuel cell calculated by the water content calculation section, and increases, on the basis of the necessary water discharge amount, a pressure difference between a reaction gas inlet section and a reaction gas outlet section formed in the fuel cell.

10. The fuel cell monitoring device according to claim 8, wherein when the calculated water content in the inside of the fuel cell exceeds the optimum water content range, the recovery control section calculates a necessary water discharge amount on the basis of a difference between an upper limit value of the optimum water content range and the water content in the inside of the fuel cell calculated by the water content calculation section, and increases, on the basis of the necessary water discharge amount, a pressure difference between a reaction gas inlet section and a reaction gas outlet section formed in the fuel cell.

11. The fuel cell monitoring device according to claim 7, wherein when the calculated water content in the inside of the fuel cell is less than the optimum water content range, the recovery control section calculates a necessary water discharge amount on the basis of a difference between a lower limit value of the optimum water content range and the water content in the inside of the fuel cell calculated by the water content calculation section, and the recovery control section decreases a temperature of the fuel cell on the basis of the necessary water discharge amount.

12. The fuel cell monitoring device according to claim 8, wherein when the calculated water content in the inside of the fuel cell is less than the optimum water content range, the recovery control section calculates a necessary water discharge amount on the basis of a difference between a lower limit value of the optimum water content range and the water content in the inside of the fuel cell calculated by the water content calculation section, and the recovery control section decreases a temperature of the fuel cell on the basis of the necessary water discharge amount.

13. The fuel cell monitoring device according to claim 9, wherein when the calculated water content in the inside of the fuel cell is less than the optimum water content range, the recovery control section calculates a necessary water discharge amount on the basis of a difference between a lower limit value of the optimum water content range and the water content in the inside of the fuel cell calculated by the water content calculation section, and the recovery control section decreases a temperature of the fuel cell on the basis of the necessary water discharge amount.

14. The fuel cell monitoring device according to claim 10, wherein when the calculated water content in the inside of the fuel cell is less than the optimum water content range, the recovery control section calculates a necessary water discharge amount on the basis of a difference between a lower limit value of the optimum water content range and the water content in the inside of the fuel cell calculated by the water content calculation section, and the recovery control section decreases a temperature of the fuel cell on the basis of the necessary water discharge amount.

* * * * *